Figure 3A:
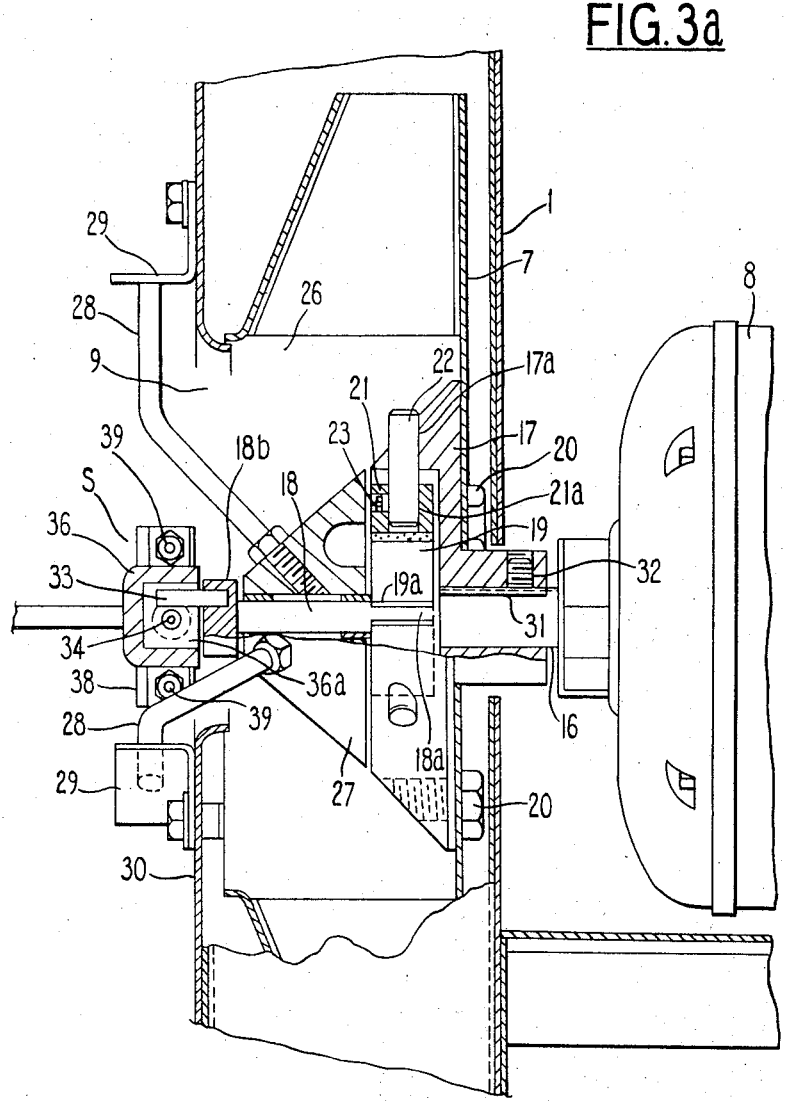

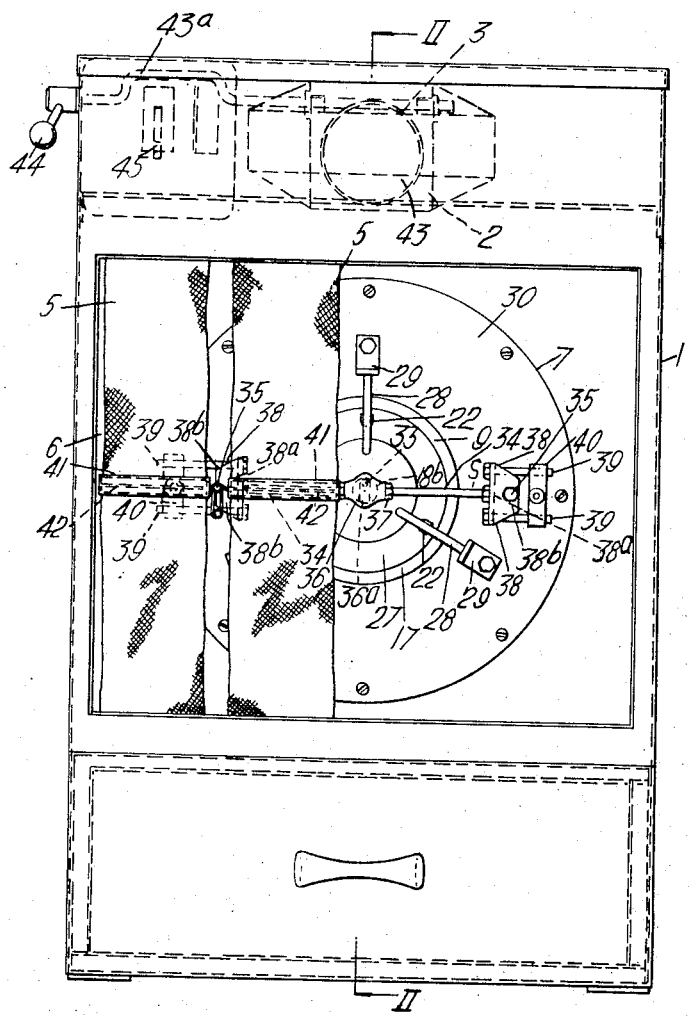

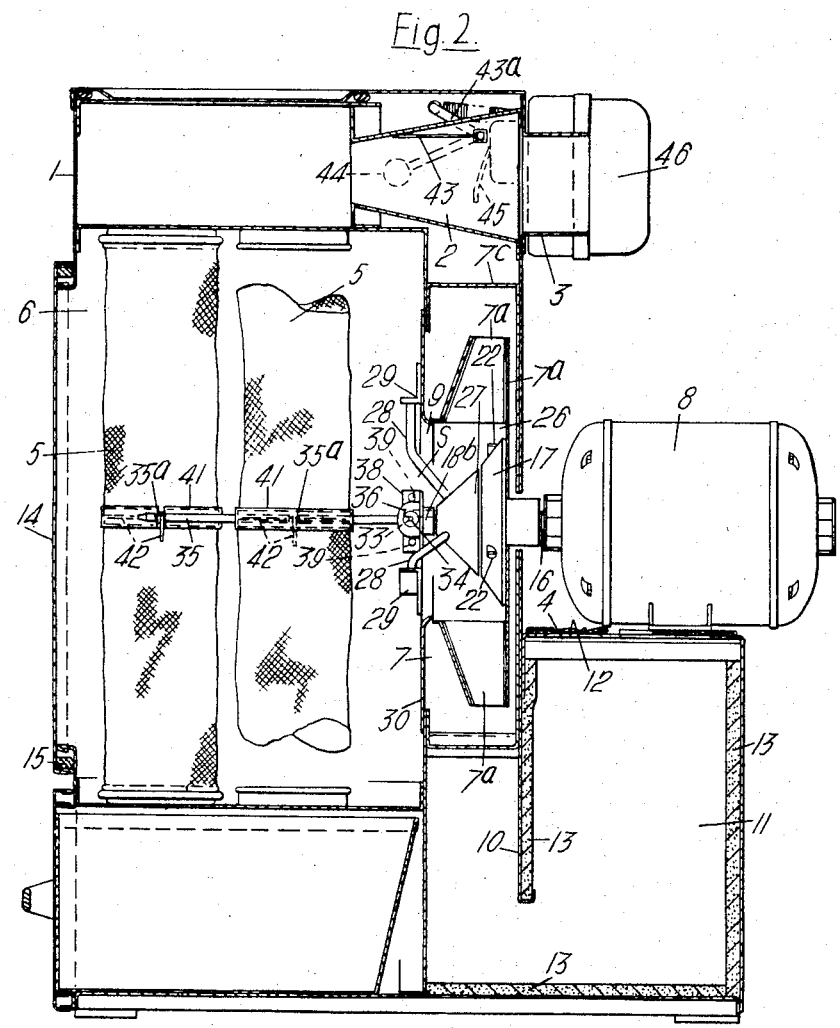

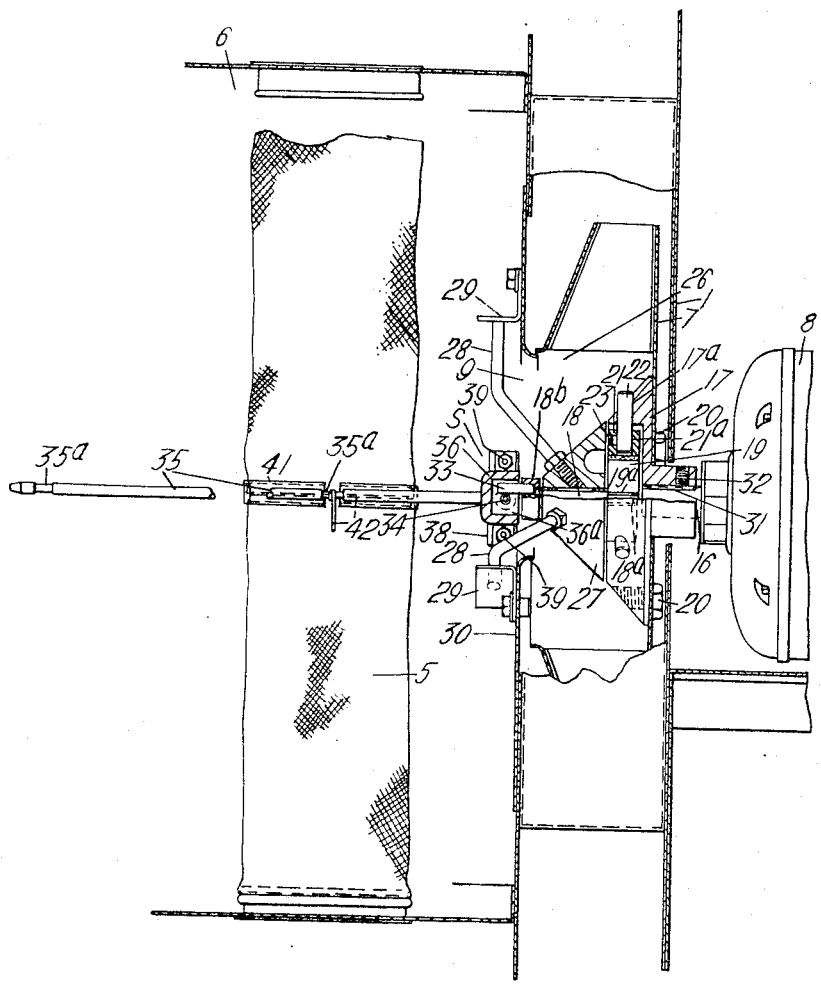

United States Patent Office 3,363,405
Patented Jan. 16, 1968

3,363,405
GAS FILTERING APPARATUS
Richard H. Baxendale, Glenfield, England, assignor to Dust Control Equipment Limited, Leicester, England
Filed July 16, 1964, Ser. No. 383,014
Claims priority, application Great Britain, July 18, 1963, 28,381/63
7 Claims. (Cl. 55—304)

This invention appertains to gas filtering units of the kind comprising, in combination, a casing having an inlet chamber for dust-laden gas, e.g. air, and at least one exhaust vent for the discharge of gas in a filtered condition, a series of filter elements which are suitably supported within a filtering section of the casing and are fabricated of, say, cotton or man-made fibre, and a motor driven fan for inducing gas and accompanying dust from a dust source to flow through the filter elements whereby the dust is separated from the gas stream, the finer dust particles being retained on the surfaces of the filter elements whilst the heavier particles fall away from the latter. Usually a suitable dust container is provided in the base of the unit for collecting the heavier dust particles.

From time to time during each period of use of a gas filtering unit of this kind the filter elements require to be shaken to remove the accumulated dust deposited upon and retained by the filtering media. For this purpose such a unit essentially includes a filter element shaking mechanism which, by vibrating, beating or any other appropriate agitating action, causes the retained dust to fall away from the surfaces of the filter elements, e.g. for collection in the aforementioned dust container in the base of the unit.

It is already known to provide a filter element shaking mechanism actuated by or from an electric motor.

The object of the present invention is to provide, in a gas filtering unit of the kind herein referred to, improved and particularly efficient filter cleaning means in the form of a motor driven shaking mechanism operated from the fan motor of the unit.

According to this invention, the filter element shaking mechanism is adapted to be coupled with the said fan motor through the medium of a centrifugally operable clutch, the arrangement being such that whenever the fan motor is switched off and the rotational speed thereof has progressively fallen to an appropriate level the said clutch will automatically function to couple the fan motor with the shaking mechanism which will thereupon be actuated until the said motor comes to rest.

The arrangement of the invention is also such that each time the fan motor is switched on and started, the filter elements will be automatically shaken, but for a much shorter period than on switching off as aforesaid, i.e. until the motor attains a rotational speed at which the centrifugally operated clutch operates to effect disengagement of the shaking mechanism from the motor shaft.

In a convenient embodiment of the filter cleaning means according to this invention the shaft of the fan motor carries relevant parts of the centrifugal clutch, the latter comprising a bob weight housing driven by the motor, a drum-constituting an opposed part of the clutch mounted upon a drive shaft of the filter element shaking mechanism and a plurality of suitably biased and appripriately shaped bob weights which are accommodated within the housing and adapted for co-operation with the said drum.

Figure 4:
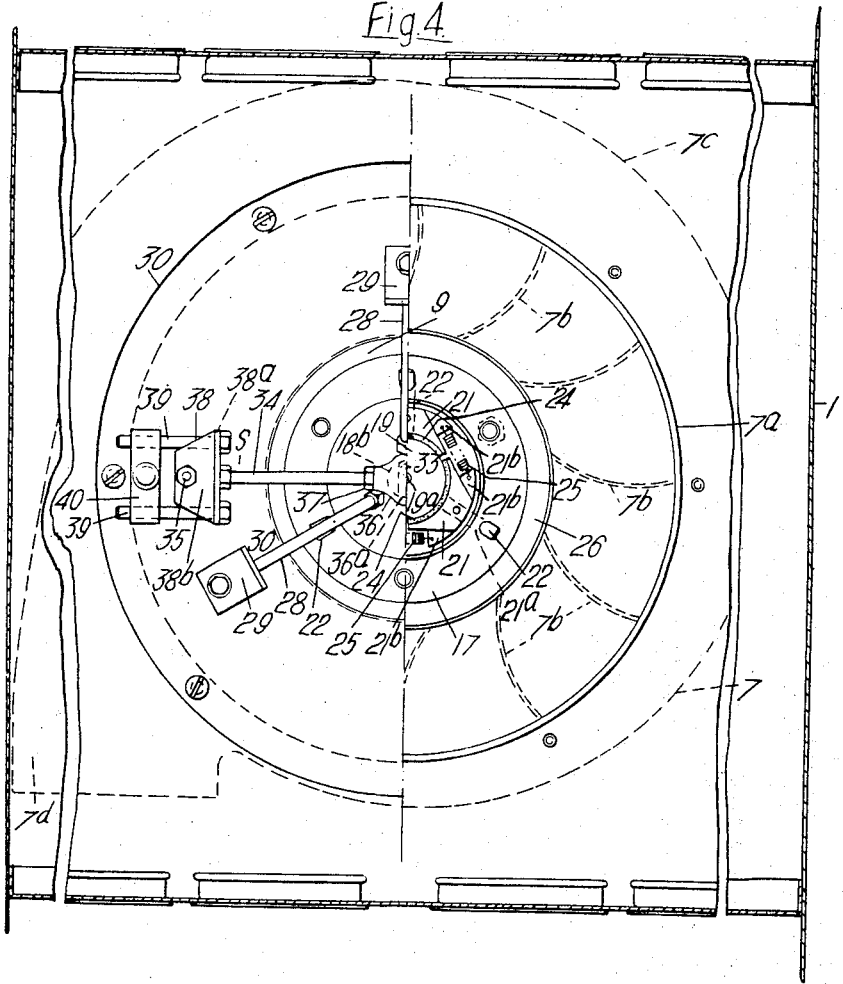
Figure 5:
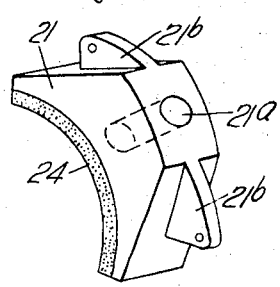

In order that the invention may be more clearly understood and readily carried into practical effect, a specific constructional form of the improved filter cleaning means will now be described with reference to the accompanying drawings, wherein, FIGURE 1 is a front elevation view of a complete gas filtering unit of the kind herein referred to equipped with a motor driven shaking mechanism constructed in accordance with the invention, the whole of the door and some of the filter sleeves of the unit being removed for the sake of clarity, FIGURE 2 is a vertical sectional view of the said unit taken on the line II—II of FIGURE 1, FIGURE 3 is a detail view showing more particularly the centrifugal clutch, of which the upper and the lower halves are shown in section and in side elevation respectively, this figure illustrating also the manner in which the shaking mechanism is connected to one of the filter sleeves, FIGURE 3a is an enlarged view showing the righthand portion of FIGURE 3, FIGURE 4 is a part-front, part-sectional view of the centrifugal clutch, a portion of the filter sleeve shaking mechanism being also depicted at the left-hand side of the figure, and FIGURE 5 is a perspective view of one of the bob weights incorporated in the centrifugal clutch.

Like parts are designed by similar reference characters throughout the drawings.

Referring to FIGURES 1 and 2 it will be seen that the gas filtering unit comprises a casing 1 having an inlet chamber 2 for dust-laden gas provided at the top thereof. A gas inlet aperture 3 located at the back of the casing leads into the chamber 2. One of the two exhaust vents for the discharge of gas in a filtered condition is indicated at 4.

A series of filter elements, in the form of vertically disposed cylindrical sleeves open at both ends, are supported within a filtering section 6 of the casing 1 and are fabricated of a gas-permeable textile material. A fan 7, directly driven by an electric motor 8, induces gas and accompanying dust to flow through the inlet chamber 2 and thereupon downwardly into the filter sleeves 5. The finer dust particles are retained on the inner surfaces of these filter sleeves 5 whilst the heavier dust particles fall away from the said sleeves and are deposited vertically downwards into a dust container. This container, provided in the base of the unit, is in the form of a drawer, thereby enabling the heavier dust particles to be readily collected and removed, as occasion demands. Gas in a filtered condition is drawn outwards from the interiors of the filter sleeves 5 through the walls of the latter and into the central fan inlet 9. The blades 7b of the fan impeller 7a move the cleaned gas through the fan casing 7c from which it is discharged vertically downwards through the fan outlet 7d (see FIGURE 4). From thence, the filtered gas passes beneath the lower end of a baffle 10, and upwardly through a hollow box 11 which is provided at the back of the casing 1 and serves as a base for the electric motor 8. The exhaust vents 4 for the discharge of the filtered gas are covered by grilles, such as 12, and are disposed at opposite sides of the motor 8. The box 11 may advantageously, and as shown in FIGURE 2, be lined with an acoustic-deadening material 13. As shown in FIGURE 2, the front of the casing 1 is normally closed by means of a removable door 14 between which door and the casing is provided a seal 15.

In accordance with the characteristic feature of the present invention, the inner end of the shaft 16 of the fan motor 8 has rigidly secured thereon, so as to be driven by the said motor, a housing 17 constituting a carrier for outer parts of a centrifugal clutch. Disposed co-axially with respect to the motor shaft 16 but separate from it is a drive shaft 18 for the filter sleeve shaking mechanism S hereinafter to be described. Mounted upon the rear end of the drive shaft 18 is a drum 19 (FIGURES 3 and 4) constituting the inner part of the centrifugal clutch.

The fan impeller 7a is attached, by means of screws 20, to the back of the housing 17. Accommodated within the housing 17 are three arcuate bob weights 21 constituting the outer clutch parts. Each such bob weight is centrally drilled radially at 21a to receive the inner end of a pin 22 forming a drive stem. Each pin is secured in the relevant bob weight 21 by means of a laterally extending grub screw 23 (see FIGURE 3) and the outer end of the pin extends through and is freely slidable within a radial hole 17a formed in the wall of the bob weight housing 17. The arcuate, i.e. concave, surface of each bob weight 21 nearest to the motor shaft axis is lined with a piece 24 of any suitable friction material engageable with the outer circumferential surface of the drum 19. The three bob weights are distributed equiangularly around the drum. Moreover, the opposite ends of each bob weight are formed, as shown more clearly in FIGURE 5, with relatively thin lugs or ears 21b by means of which all three weights are interconnected by means of tension springs 25 arranged as depicted at the right-hand side of FIGURE 4. These springs 25 normally serve to pull the bob weights 21 radially inwards with their lined inner surfaces in contact with the circumferential surface of the drum 19. But at a predetermined point in progressive increase in the rotational speed of the motor shaft 16, and hence also of the bob weight housing 17 and the fan impeller 7a carried thereby, the bob weights 21, subject to centrifugal force, will move outwards against the biasing influence of the tension springs 25, thereby effecting disengagement of the drum 19 (inner part of clutch) from the motor drive. During such outward movements of the bob weights they will be suitably guided by virtue of their drive stems 22 sliding axially within the radial holes 17a.

It will be noted that in the particular example now being described the centrifugal clutch 17, 19, 21 is wholly located within the eye 26 of the fan impeller 7a, that is, the central area of the fan within the blades 7a and is externally so aerodynamically formed as to afford minimum air resistance when the fan is in operation. In this regard the external circumferential surface of the bob weight housing 17 is bevelled, i.e. downwardly sloped, and there is provided adjacent to the said housing a fixed bearing housing 27 for the drive shaft 18 of the shaking mechanism S, the said bearing housing being of conical form and thereby adapted to present an exterior surface complementing that of the bob weight housing. In short, the bearing housing 27 forms the apex portion of a complete clutch enclosure of conical form. The bearing housing 27 is supported by three spider arms 28 which are in turn carried by angle brackets 29 bolted to the fan inlet cover plate 30.

The bob weight housing 17 is furnished with a central bored boss which is keyed at 31 to the fan motor shaft 16 and secured by a screw 32 (FIGURE 3). The rear end 18a of the drive shaft 18 is turned down and suitably screwthreaded thereby enabling it to be firmly screwed into a correspondingly tapped central hole 19a formed in the drum 19: in this way the shaft and the drum are rigidly secured together. The opposite end of the drive shaft 18 is formed with a head 18b in which is fitted an eccentric pin 33 or the like.

In the illustrated example, the filter sleeve shaking mechanism S comprises a pair of horizontally disposed and connected rods 34 arranged to be reciprocated from the eccentric pin 33, further rods 35 which are connected with and extend at right angles to the rods 34, and means for attaching the filter sleeves 5 to the rods 35. The rods 34 are co-axially arranged and connected by a central drive block 36. Thus, the inner ends of the said rods are screwthreaded and screwed into tapped holes formed in opposite ends of the drive block 36, nuts 37 being provided to lock the screwed connections. The outer end of each of these same rods 34 is also screwthreaded to enable it to have attached thereto a flanged carrier element 38 of right angular form. Each carrier element 38 has secured to its flange 38a a pair of suitably spaced parallel guide pins 39 arranged to slide freely to and fro within bearing holes formed in a nylon slide block 40. These slide blocks 40 are secured upon the front of the fan inlet cover plate 30. The appropriate ends of the rods 35 are secured in the face portions 38b of the flanged carrier elements 38. In the back of the drive block 36 is formed a vertical recess 36a into which the eccentric pin 33 protrudes. In this way there is provided a unitary system of rods which is movable to and fro by the eccentric pin.

As will be seen in FIGURES 1, 2 and 3, each of the filter sleeves 5 is nearly completely embraced by a relatively narrow band of tape 41 which is stitched in position and serves to locate and house a wire ring 42. The ends of each wire ring are suitably secured together and anchored to the relevant rod 35 which, to facilitate the anchorage, is waisted, i.e. circumferentially grooved, as at 35a. In the specific example illustrated, the filtering section 6 of the casing 1 accommodates eight of the filter sleeves 5—arranged in four pairs of which two pairs are disposed at respectively opposite sides of each of the two rods 35. Consequently, by forming two axially spaced grooves 35a in each rod 35 adequate provision is made for attaching to the latter four of the filter sleeves 5. In any event, the arrangement of the shaking mechanism S is such that as the pair of aligned and guided rods 34 is reciprocated as the result of the eccentric motion of the pin 33, the two further rods 35 will be rapidly displaced to and fro laterally to shake the sleeves 5 attached thereby.

Pivotally mounted within the gas inlet chamber 2 is a flap valve 43 which, as depicted in FIGURE 2, is operated by means of a handle 44. Whenever it is moved to close the inlet to the filter, the cranked spindle 43a of the valve 43 automatically functions to operate a microswitch 45 to switch off the fan motor 8. The motor starter is indicated at 46.

With the fan motor 8 stopped, the linings 24 of the bob weights 21 are in engagement with the outer circumferential surface of the drum 19. Consequently, upon opening the flap valve 43 and switching on the fan motor, the drum 19 will initially be driven for a short period to actuate the shaking mechanism S through the medium of the eccentric pin 33. But at a certain point in the progressive increase in the rotational speed of the motor 8, the bob weights 21, as previously explained, will move outwards to effect disengagement of the drum 19 from the motor drive. Conversely, whenever the flap valve 43 is closed and the fan motor is thereby automatically switched off, the consequent fall in the rotational speed of the motor to the aforementioned point will permit the bob weight 21 to move inwards, under the biassing influence of the tension springs 25, into engagement with the drum 19 so as to couple the drive shaft 18 to the motor shaft 16 with the result that the filter sleeve shaking mechanism S is again operated but for a somewhat more prolonged period—in fact until the fan motor actually comes to rest.

With the air supply to the fan and the filter elements cut off by means of the closed flap valve the dust will readily fall from the surface of the filter elements under the influence of the shaking mechanism and there will be no tendency for small dust particles to be beaten into or through the filter fabric. Moreover the fan impeller having the air passage through it acts as a flywheel whose inertia assists in prolonging the shaking period and giving a more thorough clearing of the filter elements.

I claim:

1. A gas filtering unit comprising, in combination, a casing having an inlet chamber with an inlet for dust-laden gas, a filter chamber and at least one exhaust vent for the discharge of gas in a filtered condition; filter elements supported within said filter chamber; a fan comprising a rotary impeller and a casing therefor mounted within the unit casing between the inlet chamber and the exhaust vent for inducing gas and accompanying dust from a dust source to flow through the filter elements whereby the dust is separated from the gas stream, the finer dust particles being retained on the surfaces of the filter elements whilst the heavier particles fall away from the latter; a dust container located in the base of the unit for collecting the heavier dust particles; an electric motor for driving the said fan; said motor having a shaft coupled with the fan impeller; a bob weight housing rigidly secured upon said motor shaft so as to rotate therewith; the external circumferential surface of the said housing being bevelled; a centrifugal clutch having an outer part connected to said motor shaft and an inner part connected to a drum, a plurality of bob weights mounted within said housing for movements radially inwards and outwards in response to the centrifugal force applied thereto, said weights constituting said outer parts of the centrifugal clutch; means biassing the said weights inwards; a shaking mechanism including a rotary drive shaft operatively connected to said filter elements for shaking the filter elements; a drum mounted upon said rotary drive shaft and constituting the inner part of said centrifugal clutch; a fixed bearing housing for said rotary drive shaft, said bearing housing being of conical form and presenting an exterior surface complementing that of the bob weight housing whereby the said bearing housing forms the apex portion of a complete clutch enclosure of conical form which includes the bob weight housing and is located within the central portion of the fan impeller within the blades thereof, the arrangement being such that whenever the fan motor is switched off and the rotational speed thereof has progressively fallen to an appropriate level the bob weights will move under the said influence of the biassing means into contact with the surface of the drum to couple the fan motor with the said shaking mechanism, whereas each time the fan motor is started the filter elements will be automatically shaken until the motor attains a rotational speed at which the bob weights move outwards away from the drum against the action of the biassing means to disengage the shaking mechanism from the motor.

2. A gas filtering unit according to claim 1, wherein the bob weights are arcuate shaped and interconnected with biassing tension springs, the surfaces of the weights nearest to the motor shaft axis being lined with friction material engageable with the outer circumferential surface of the drum.

3. A gas filtering unit according to claim 1, wherein each bob weight is furnished with a drive stem which is slidable radially inwards and outwards within a hole formed in the wall of the bob weight housing.

4. A gas filtering unit according to claim 1, wherein the bob weight housing is formed with a central bored boss which is keyed to and secured upon the fan motor shaft.

5. A gas filtering unit according to claim 1, wherein the said bearing component is supported by arms carried by brackets secured to the fan casing.

6. A gas filtering unit according to claim 1, wherein the rotary drive shaft of the filter element shaking mechanism is provided with an eccentric pin which is engaged in the said mechanism to move the latter to and fro.

7. A gas filtering unit according to claim 1, wherein the shaking mechanism comprises an eccentric pin carried by said rotary drive shaft, a central drive block receiving said eccentric pin, rods connected to the filter elements and to said central drive block and movable in response to actuation of said block by said eccentric pin to shake the filter elements.

References Cited

UNITED STATES PATENTS

| 987,987 | 3/1911 | Hinz | 192—104 |
| 1,122,206 | 12/1914 | Jennings | 192—89 |
| 2,005,350 | 6/1935 | Rickwood | 192—89 |
| 2,781,104 | 2/1957 | Fischer | 55—304 |
| 3,097,939 | 7/1963 | Schneider | 55—304 |

FOREIGN PATENTS 1,060,698  7/1959  Germany.

HARRY B. THORNTON, *Primary Examiner.*

S. W. SOKOLOFF, *Assistant Examiner.*